United States Patent
Kohli et al.

(10) Patent No.: US 11,803,827 B2
(45) Date of Patent: Oct. 31, 2023

(54) METHOD AND SYSTEM FOR ENABLING CARDLESS TRANSACTIONS AT AN ATM FOR ANY INSTITUTIONAL ENTITY

(71) Applicant: MASTERCARD INTERNATIONAL INCORPORATED, Purchase, NY (US)

(72) Inventors: Manoneet Kohli, White Plains, NY (US); Shane Lansley Jorge Jose Deniz, Ardsley, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 594 days.

(21) Appl. No.: 16/671,333

(22) Filed: Nov. 1, 2019

(65) Prior Publication Data

US 2021/0133710 A1    May 6, 2021

(51) Int. Cl.
*G06Q 20/10* (2012.01)
*G06Q 20/40* (2012.01)
*G07F 19/00* (2006.01)

(52) U.S. Cl.
CPC ....... *G06Q 20/1085* (2013.01); *G06Q 20/401* (2013.01); *G07F 19/202* (2013.01);
(Continued)

(58) Field of Classification Search
CPC ............. G06Q 20/1085; G06Q 20/405; G06Q 2220/00; G07F 19/202; G07F 19/203; G07F 19/204
(Continued)

(56) References Cited

U.S. PATENT DOCUMENTS 5,963,647 A   10/1999  Downing et al.
6,182,894 B1   2/2001  Hackett et al.
(Continued)

FOREIGN PATENT DOCUMENTS

CN          101882343 A     11/2010
KR   10-2018-0027770 A      3/2018
(Continued)

OTHER PUBLICATIONS

Office Action dated Apr. 29, 2021, by the Canadian Intellectual Property Office in corresponding Canadian Patent Application No. 3,024,885. (5 pages).
(Continued)

*Primary Examiner* — Courtney P Jones
(74) *Attorney, Agent, or Firm* — Panitch Schwarze Belisario & Nadel LLP

(57) ABSTRACT

A method for performing on-behalf tokenization for an automated teller machine (ATM) transaction to enable cardless transactions for any institutional entity includes: receiving, by a receiver of a processing server, a withdrawal request from a first computing system, the withdrawal request including at least a payment token and transaction data; validating, by a processor of the processing server, the payment token included in the withdrawal request; transmitting, by a transmitter of the processing server, the payment token to a second computing system; receiving, by the receiver of the processing server, cryptographic data from the second computing system; transmitting, by the transmitter of the processing server, at least the payment token, cryptographic data, and transaction data to a third computing system, wherein the first computing system, third computing system, and processing server are separate and distinct systems.

14 Claims, 5 Drawing Sheets

(52) U.S. Cl.
CPC .......... *G07F 19/203* (2013.01); *G07F 19/204* (2013.01); *G06Q 2220/00* (2013.01)

(58) Field of Classification Search
USPC .......................................................... 705/50
See application file for complete search history.

(56) References Cited

U.S. PATENT DOCUMENTS

| | | | |
|---|---|---|---|
| 8,556,164 | B1 | 10/2013 | Freedman et al. |
| 8,725,640 | B2 | 5/2014 | Mateo Delgado et al. |
| 9,418,358 | B2 | 8/2016 | Johnson et al. |
| 10,013,684 | B2 | 7/2018 | Keys et al. |
| 10,255,588 | B2 | 4/2019 | Singhal |
| 10,255,589 | B1* | 4/2019 | Petruzzi ................. G06Q 20/40 |
| 10,275,827 | B2 | 4/2019 | McCarthy |
| 10,535,047 | B1 | 1/2020 | Thomas et al. |
| 10,706,400 | B1* | 7/2020 | Puffer ............... G06Q 20/38215 |
| 11,410,194 | B1* | 8/2022 | Goetz ................. G06K 7/1413 |
| 2002/0026426 | A1 | 2/2002 | Bennett |
| 2004/0039702 | A1 | 2/2004 | Blair et al. |
| 2005/0113137 | A1 | 5/2005 | Rodriguez et al. |
| 2006/0206709 | A1 | 9/2006 | Abrou et al. |
| 2009/0078758 | A1 | 3/2009 | Crowell |
| 2011/0137795 | A1 | 6/2011 | Nambiar et al. |
| 2011/0238573 | A1 | 9/2011 | Varadarajan |
| 2012/0023567 | A1 | 1/2012 | Hammad |
| 2012/0160912 | A1 | 6/2012 | Laracey |
| 2012/0226610 | A1 | 9/2012 | Gill et al. |
| 2014/0108249 | A1 | 4/2014 | Kulpati et al. |
| 2015/0199671 | A1 | 7/2015 | Bajaj et al. |
| 2016/0019537 | A1 | 1/2016 | Raja et al. |
| 2016/0104146 | A1 | 4/2016 | Peyton et al. |
| 2016/0162869 | A1 | 6/2016 | Gupta et al. |
| 2016/0358139 | A1 | 12/2016 | Keys et al. |
| 2017/0124544 | A1 | 5/2017 | Recriwal et al. |
| 2017/0162004 | A1* | 6/2017 | Hughes ................. G07F 19/203 |
| 2017/0243184 | A1* | 8/2017 | Bondesen .......... G06Q 20/4012 |
| 2017/0262823 | A1 | 9/2017 | Hartung |
| 2017/0373852 | A1* | 12/2017 | Cassin ................. H04L 63/062 |
| 2018/0005206 | A1 | 1/2018 | Belin et al. |
| 2018/0068297 | A1 | 3/2018 | Goodman et al. |
| 2018/0068312 | A1 | 3/2018 | Kim et al. |
| 2018/0218356 | A1* | 8/2018 | Grassadonia ........ G06Q 20/322 |
| 2019/0012668 | A1* | 1/2019 | Hambleton ............ G06Q 40/02 |
| 2019/0073663 | A1* | 3/2019 | Jamkhedkar ....... G06Q 20/3274 |
| 2019/0073675 | A1* | 3/2019 | Anamanamuri ..... G06Q 20/384 |
| 2019/0108731 | A1* | 4/2019 | Hazard ............. G06Q 20/1085 |
| 2019/0213673 | A1* | 7/2019 | McCarthy ............. G06Q 40/02 |
| 2020/0051060 | A1* | 2/2020 | Vityaz ................ G06Q 20/3278 |
| 2020/0090166 | A1* | 3/2020 | Tonini .................. G06Q 20/385 |
| 2020/0273022 | A1* | 8/2020 | McFarren .............. G06Q 20/02 |
| 2020/0327515 | A1* | 10/2020 | McCarley ............. G06Q 20/42 |
| 2021/0042743 | A1* | 2/2021 | Green .................. G06Q 20/409 |
| 2021/0319672 | A1 | 10/2021 | Kim |
| 2022/0051210 | A1 | 2/2022 | Phillips et al. |
| 2022/0270167 | A1* | 8/2022 | Xu ..................... G06Q 20/3224 |

FOREIGN PATENT DOCUMENTS

| | | | |
|---|---|---|---|
| WO | 2015/054697 | A1 | 4/2015 |
| WO | 2015/084755 | A1 | 6/2015 |
| WO | 2015/172150 | A1 | 11/2015 |
| WO | 2016/089629 | A1 | 6/2016 |

OTHER PUBLICATIONS

Office Action (Communication pursuant to Article 94(3) EPC) dated May 19, 2021, by the European Patent Office in corresponding European Patent Application No. 17 768 299.4-1222. (8 pages).

Written Opinion dated Jun. 21, 2021, by the Intellectual Property Office of Singapore in corresponding Singapore Patent Application No. 11201809689V. (6 pages).

Final Office Action issued by the U.S. Patent and Trademark Office in the U.S. Appl. No. 15/693,822, dated Nov. 3, 2021, U.S. Patent and Trademark Office, Alexandria, VA. (92 pages).

Notification of Transmittal of the International Search Report (Forms PCT/ISA/220 and PCT/ISA/210) and the Written Opinion of the International Searching Authority (Form PCT/ISA/237) dated Mar. 8, 2021, by the International Application Division Korean Intellectual Property Office in corresponding International Application No. PCT/US2020/057442. (9 pages).

Non-Final Office Action issued by the U.S. Patent and Trademark Office in the U.S. Appl. No. 15/693,822, dated Sep. 3, 2020, U.S. Patent and Trademark Office, Alexandria, VA. (47 pages).

Non-Final Office Action issued by the U.S. Patent and Trademark Office in the U.S. Appl. No. 15/693,822, dated Jun. 10, 2021, U.S. Patent and Trademark Office, Alexandria, VA. (86 pages).

Office Action issued Jun. 8, 2020, by the Canadian Intellectual Property Office in corresponding Canadian Patent Application No. 3,024,885. (5 pages).

Hamblen, Matt, "A Short history of NFC", Computerworld, (Dec. 19, 2012), (5 pages).

Non-Final Office Action issued by the U.S. Patent and Trademark Office in the U.S. Appl. No. 15/633,935, dated Mar. 17, 2022, U.S. Patent and Trademark Office, Alexandria, VA. (17 pages).

* cited by examiner

METHOD AND SYSTEM FOR ENABLING CARDLESS TRANSACTIONS AT AN ATM FOR ANY INSTITUTIONAL ENTITY

FIELD

The present disclosure relates to enabling cardless transactions to be conducted at an automated teller machine (ATM) by a user for any institutional entity beyond financial institutions, specifically the use of on-behalf tokenization to enable a withdrawal to be conducted at an ATM on any type of entity-related account beyond traditional transaction accounts.

BACKGROUND

Automated teller machines (ATMs) have provided convenience for cardholders for decades, providing a stand-alone, automated kiosk where a cardholder can check their balance, make a withdrawal, make a deposit, and more. Traditionally, a cardholder would insert their payment card in the ATM, supply their PIN, and would then be authenticated and able to perform a transaction. Over the years, technology has developed to enable cardholders to regularly conduct transactions at merchants by alternative means than a traditional payment card. For instance, smartphones and smart watches can often store and transmit card details and replace use of a traditional payment card.

However, ATMs have been significantly slower than traditional points of sale in developing such technology. Most recently, methods have been developed that can enable a cardholder to make a withdrawal at an ATM without having their payment card present, which is accomplished by the cardholder receiving a unique single-use code on their mobile device from their issuing institution and entering the code into the ATM, which can then authenticate and identify the user accordingly. In such cases, the mobile device operates as the interface for the ATM, with the ATM itself performing the actual collection or dispensing functions. However, these implementations rely on the cardholder's financial institution to perform the requisite identification and authentication functions, and to transmit the appropriate instructions to the ATM.

In many parts of the world, the average consumer may be unable to have a traditional transaction account, such as due to credit issues, a lack of available institutions, a distrust of the financial industry, etc. In these places, consumers often rely solely on their mobile device for conducting payment transactions, and will commonly do so via prepaid means. In many instances, non-financial institutions can provide consumers with the ability to conduct transactions. For example, a merchant may enable their consumers to have prepaid accounts for use in transactions involving that merchant, but where the merchant does not provide additional functionality that is common for financial institutions, such as issuing banks and credit card providers. In another example, social networks often provide their users with a type of digital currency that can be used in transactions involving the social network and authorized merchants.

However, these systems and solutions rely on the use of mobile devices by consumers, and lack the infrastructure and functionality of traditional financial institutions. As a result, the ability for these types of consumers to use an ATM and perform actions thereof, in particular withdrawals, is lacking. Thus, there is a need to enable a consumer of any type of institutional entity to be able to make a withdrawal at an ATM on an account via a cardless transaction.

SUMMARY

The present disclosure provides a description of systems and methods for performing on-behalf tokenization for an automated teller machine (ATM) transaction to enable cardless transactions for any institutional entity. A back-end system that operates separate from the ATM operator and the institutional entity utilizes tokenization to enable a payment token to be generated on behalf of the institutional entity to be used by their consumer via a mobile device. The consumer, who may not have a traditional transaction account, may use this payment token at an ATM to make a withdrawal. The back-end system can perform the validation and mapping necessary to enable the withdrawal to be processed successfully through the institutional entity and ATM operator. As a result, a consumer can make a cardless withdrawal at an ATM from an account associated with a non-financial institution, a function that unavailable at existing ATMs.

A method for performing on-behalf tokenization for an automated teller machine (ATM) transaction to enable cardless transactions for any institutional entity includes: receiving, by a receiver of a processing server, a withdrawal request from a first computing system, the withdrawal request including at least a payment token and transaction data; validating, by a processor of the processing server, the payment token included in the withdrawal request; transmitting, by a transmitter of the processing server, the payment token to a second computing system; receiving, by the receiver of the processing server, cryptographic data from the second computing system; transmitting, by the transmitter of the processing server, at least the payment token, cryptographic data, and transaction data to a third computing system, wherein the first computing system, third computing system, and processing server are separate and distinct systems.

A system for performing on-behalf tokenization for an automated teller machine (ATM) transaction to enable cardless transactions for any institutional entity includes: a first computing system; a second computing system; a third computing system; and a processing server, the processing server including a receiver receiving a withdrawal request from the first computing system, the withdrawal request including at least a payment token and transaction data, a processor validating the payment token included in the withdrawal request, and a transmitter transmitting the payment token to the second computing system, wherein the receiver of the processing server further receives cryptographic data from the second computing system, the transmitter of the processing server further transmits at least the payment token, cryptographic data, and transaction data to the third computing system, and the first computing system, third computing system, and processing server are separate and distinct systems.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
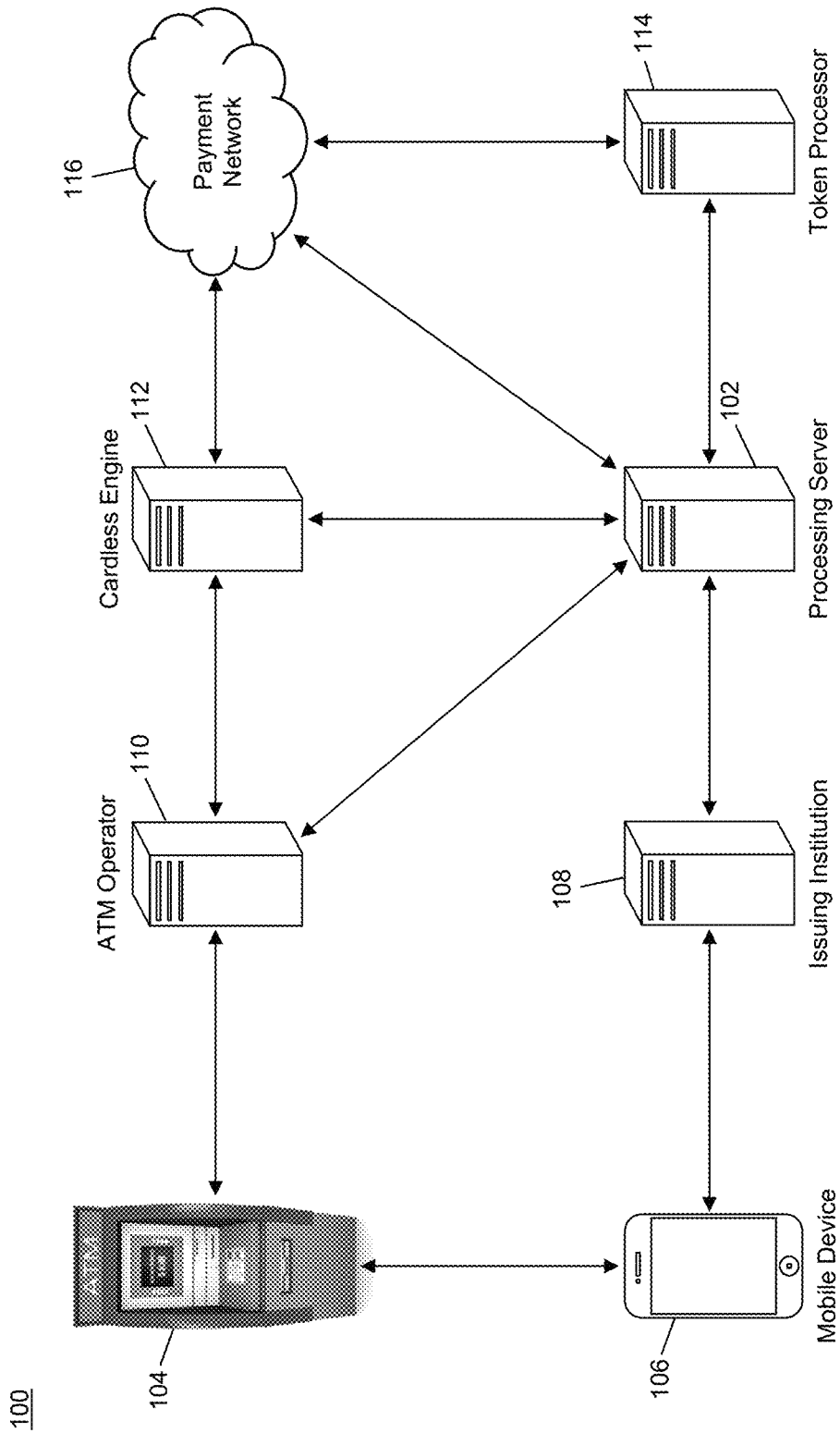
FIG. 1 is a block diagram illustrating a high level system architecture for cardless transactions at an automated teller machine (ATM) using on-behalf tokenization in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc. As used herein, an "issuing institution" refers to any entity that issues an account that is usable by a consumer to perform functions at an automated teller machine and, in some cases, traditional payment transactions, including in instances where the entity may not be a traditional financial institution, such as a social network, mobile device application provider, etc.

System for Cardless Automated Teller Machine Transactions

FIG. 1 illustrates a system 100 for the performing of cardless transactions at an automated teller machine (ATM) 104 for non-financial institution entities through on-behalf tokenization.

The system 100 may include a processing server 102. The processing server 102, discussed in more detail below, may be configured to perform back-end functions to enable a cardless withdrawal to be performed at an ATM 104. The processing server 102 may operate in conjunction with a cardless engine 112 and/or token processor 114 in the creation and issuance of a payment token, validation thereof, and performing of functions related to the use of the payment token and processing of a withdrawal at the ATM 104. In some cases, the processing server 102 may be configured to perform some or all of the functions of the cardless engine 112 and token processor 114 as discussed herein. In other cases, the cardless engine 112 and/or token processor 114 may be distinct and separate computing systems from the processing server 102.

In the system 100, a consumer may possess a mobile device 106 that they wish to use in making a cardless withdrawal at the ATM 104. The consumer may have an account with an issuing institution 108, where the consumer may have an amount of currency available from the issuing institution 108 for withdrawal at the ATM 104. In an exemplary embodiment, the issuing institution 108 may be a non-financial institution entity, such as a social network, application program provider, etc. For example, the consumer may be a user of a social network, where the social network enables the user to have an account therewith with a balance that can be withdrawn from the ATM 104 using the methods discussed herein. The mobile device 106 may be any type of computing device suitable for performing the functions discussed herein, such as a cellular phone, smart phone, smart watch, wearable computing device, tablet computing device, laptop computing device, etc.

When the consumer wants to conduct a cardless withdrawal at the ATM 104 for their account with the issuing institution 108, the consumer may approach the ATM 104 with their mobile device 106. The ATM 104 may have an interface interactable with the consumer, where the consumer may make a selection on the interface of the ATM 104 indicating that they want to make a cardless withdrawal. Once the selection has been made, the ATM may generate a random or pseudo-random value that may be used for authentication and session identification. The value, referred to herein as an "unpredictable number" may be transmitted to an ATM operator 110. The ATM operator 110 may be a computing system that serves as a back-end operator for the ATM 104, such as to facilitate communications with additional systems and entities. The ATM operator 110 may receive the unpredictable number (UN) and transmit the UN to the cardless engine 112.

The cardless engine 112 may generate a validation code using the UN. In some cases, the ATM operator 110 and/or cardless engine 112 may first validate the UN, such as by ensuring that the UN conforms to predetermined criteria (e.g., known only to authorized ATM operators 110 and/or ATMs 104) or was generated by the ATM 104 as an authorized device, such as using a private key that may be validated using a corresponding public key possessed by the ATM operator 110 and/or cardless engine 112. The validation code may be generated by the cardless engine 112 using the UN using any suitable type of algorithm. The validation code may be any type of value that may be used for validation of the cardless transaction as discussed herein. For example, the validation code may be a ten digit number, a sixteen digit alphanumeric value, etc.

The cardless engine 112 may return the validation code to the ATM operator 110, which may forward the validation code on to the ATM 104. The ATM 104 may then display the validation code on a display device thereof. In some cases, the validation code may be encoded in a machine-readable code, such as a bar code or quick response (QR) code, which may be readable by an optical imaging device of the mobile device 106. In other cases, the validation code may be displayed directly, for entry by the consumer in the mobile device 106 using an input device interfaced therewith. In yet other cases, the ATM 104 may electronically transmit the validation code to the mobile device 106, such as through near field communication, Bluetooth, or other suitable communication method.

The consumer may, using the mobile device 106, execute an application program on the mobile device that is used for conducting the cardless withdrawal at the ATM. The application program may be associated with the issuing institution 108 and/or may be an application program dedicated for performing the functions of the system 100 as discussed herein. In some cases, the validation code may be received separately from the execution of the application program in the mobile device 106. In other cases, the application program may be executed by the mobile device 106 and the validation code input into the mobile device 106 as part of the functionality of the application program.

Using the application program, the user of the mobile device 106 may select/input the validation code, may select the account (e.g., issued by the issuing institution 108) from which they would like to make a withdrawal, and select the amount that they would like to withdrawal. In some cases, the amount may be entered in the ATM 104 when requesting the cardless withdrawal (e.g., where the ATM 104 may validate that it has a suitable amount of the appropriate type of currency for the withdrawal), where the amount may be transmitted as part of or accompanying the validation code. Once the validation code, account selection, and withdrawal amount have been provided, the application program may, via the functionality of the mobile device 106, electronically transmit the data to the issuing institution 108 using a suitable communication network and method, such as the Internet, a cellular communication network, etc.

The issuing institution 108 may receive the data from the mobile device 106. In cases where the account selected by the consumer is not a traditional transaction account or otherwise does not have an account number available for use in traditional processing, the issuing institution 108 may request on-behalf tokenization to be performed. As part of this process, the issuing institution 108 may electronically transmit a request for tokenization to the processing server 102 using a suitable communication network and method, where the request includes at least the amount to be withdrawn. In some cases, an identifier for the account selected by the consumer may be included in the payment token request. The processing server 102 may electronically transmit a payment token request to the token processor 114 (e.g., as a separate computing system or as functionality in the processing server 102, depending on implementation). The token processor 114 may then generate the payment token. The payment token may be a digital value that can operate as a payment account number for a payment transaction, such as a sixteen digit numerical value that resembles a traditional payment card number, where a bank identification number included therein may be indicative of the value being a payment token. In cases where the token processor 114 is a separate computing system from the processing server 102, the token processor 114 may first request approval from the issuing institution 108 prior to generating the payment token. In some cases, a bank identification number or other indicator portion of the payment token value may be associated directly with the issuing institution 108. In some instances, the payment token value may have a portion associated with the issuing institution 108 as well as a portion indicating that the number is part of a payment token.

Once the payment token has been generated, the payment token may be transmitted to the processing server 102 by the token processor 114 using a suitable communication network and method. The processing server 102 may store the payment token in a memory or other suitable storage therein. In cases where the account identifier for the selected account was provided by the issuing institution 108, the payment token may be stored with the account identifier that is directly associated therewith. The processing server 102 may transmit the payment token back to the issuing institution 108, where the issuing institution 108 may store the payment token with the account information for the account that was selected by the consumer for use in the cardless ATM withdrawal.

In order for the payment token to be used in the withdrawal, the appropriate payment credentials must be supplied along with the payment token. Once the payment token has been generated and provided to the issuing institution 108, the processing server 102 may request that the token processor 114 generate the appropriate payment credentials for the payment token. The token processor 114 may generate the payment credentials, also referred to herein as "cryptographic" or "crypto" data. The crypto data may include card verification codes, application transaction counters, payment cryptograms, and/or any other data that may be used by ATMs 104, payment networks 116, and other entities in the processing of a withdrawal or other transaction involving an ATM 104. For instance, if a traditional card-based withdrawal required two payment cryptograms and a card verification code (e.g., typically provided and/or generated by the transaction card itself), then the token processor 114 would generate two payment cryptograms and a card verification code for the payment token. The crypto data may be provided back to the processing server 102 by the token processor 114.

The processing server 102 may then electronically transmit an instruction to the cardless engine 112 to initiate the cardless withdrawal transaction with the ATM 104. In some cases, the instruction may be submitted through an application programming interface (API) of the cardless engine 112. The instruction may include the payment token, crypto data, withdrawal amount, and any other data that may be necessary for a withdrawal with the ATM 104. The cardless engine 112 may receive the instructions and data from the processing server 102, and may validate any of the data as necessary. For instance, the validation code may be submitted by the mobile device 106 in the initial request, which may be provided by the issuing institution 108 to the processing server 102 and included in the data provided to the cardless engine 112 thereby, where the cardless engine 112 may validate the validation code to ensure that information pertains to the withdrawal initiated by the consumer at the ATM 104. The cardless engine 112 may generate a request message that is electronically transmitted to the ATM operator 110. The request message may include the payment token, withdrawal amount, crypto data, and any other data that was provided by the processing server 102, as well as any other information that may be needed by the ATM operator 110, such as the validation code.

The ATM operator 110 may receive the data and may forward an instruction to the ATM 104 requesting that the withdrawal transaction process be initiated. The ATM 104 may then start the withdrawal process using traditional methods thereof. For instance, in some cases, the ATM 104 may request authentication information from the consumer, such as a personal identification number (PIN), one-time password, etc. The ATM 104 may receive any such information, perform any authentication functions related therewith, and may transmit any received using input to the ATM operator 110. The ATM operator 110 may then generate a transaction message for the withdrawal transaction. A transaction message may be a specially formatted type of data message that is formatted according to one or more standards governing the interchange of electronic transaction messages, such as the International Organization of Standardization's ISO 8583 or ISO 20022 standards. The transaction message may include at least the payment token, withdrawal amount, crypto data, and any other information necessary for use in processing an ATM withdrawal, such as an identifier of the ATM 104, a transaction time and/or date, etc. The data stored in the transaction message, referred to herein as "transaction data," may be stored in one or more data elements of the transaction message, as may be specified in the applicable standard(s). In some cases, the transaction message may include a message type indicator, which may indicate that the transaction message is for an ATM withdrawal or an authorization request.

The ATM operator 110 may submit the transaction message to a payment network 116 for processing, either directly via any suitable communication network or method or via the cardless engine 112 or other intermediary entity or system. The payment network 116 may receive the transaction message and may validate the data included therein using traditional methods and systems, where validation may include validation of the crypto data and payment token using traditional methods. Once the crypto data is validated, the payment network 116 may route the transaction message to the token processor 114 or processing server 102 for processing. In some cases, the bank identification number or other value in the payment token may be used by the payment network 116 in routing the transaction message to the processing server 102 or token processor 114 as the issuing entity for the transaction (e.g., as opposed to a traditional issuing bank for a standard payment transaction). The processing server 102 or token processor 114 may perform any validation of the crypto data as necessary, and may detokenize the transaction by replacing the payment token with the account identifier associated therewith that was provided by the issuing institution 108 during the enrollment process discussed above.

Once the transaction message has been detokenized and includes the original account identifier, the transaction message may be forwarded on to the issuing institution 108. In some cases, the detokenized transaction message may be forwarded to the issuing institution 108 directly by the processing server 102 and/or token processor 114 (or from the token processor 114 to the processing server 102 and on to the issuing institution 108). In other cases, the token processor 114 or processing server 102 may return the detokenized transaction message to the payment network 116, which may forward the detokenized transaction message to the issuing institution 108. The issuing institution 108 may receive the detokenized transaction message, which includes the withdrawal amount and the account identifier for the account associated with the consumer that was selected for the withdrawal. The issuing institution 108 may determine if the withdrawal should be approved (e.g., the consumer has enough balance in their account to cover the withdrawal) and may return a response message to the payment network 116, processing server 102, or token processor 114, as appropriate. The response message may be a transaction message where the message type indicator indicates that the message is an authorization response or otherwise related to approval of the initial transaction message. In some cases, the response message may include a response code indicating approval in one of the data elements, such as specified by the applicable standard(s).

In some cases, the processing server 102 or token processor 114 may re-tokenize the response message by replacing the account identifier with the payment token (e.g., prior to forwarding the response message to the payment network 116 from the issuing institution 108, or at the request of the payment network 116). The payment network 116 may receive the response message and may forward the response message to the ATM operator 110 using a suitable communication network and method, such as the payment rails associated with the payment network 116, where the response message may be transmitted directly to the ATM operator 110 or through an intermediary, such as the cardless engine 112. The ATM operator 110 may receive the response message and identify the approval response code therein, and instruct the ATM 104 to dispense the withdrawal amount to the consumer. The ATM 104 may receive the instruction and dispense the appropriate amount of currency to the consumer. The consumer may then receive the currency via a cardless transaction with the ATM 104 using their account with the issuing institution 108, which may be a non-financial institution entity.

In some cases, the ATM operator 110 may notify the cardless engine 112 of the approved and successfully completed withdrawal. In such cases, the cardless engine 112 may notify the processing server 102, which may transmit a notification message to the issuing institution 108 informing the issuing institution 108 that the dispensing of the currency completed successfully. In such instances, the issuing institution 108 may transmit a notification message to the mobile device 106, such as for display to the consumer as part of the application program. For example, as the ATM 104 dispenses the currency, the consumer may see a notification on their application program that the cardless withdrawal was processed successfully and they should be seeing the dispensing of the currency at the ATM 104 concurrently. In cases where the withdrawal may not be approved, the issuing institution 108 may transmit a notification to that effect to the mobile device 106 for display to the consumer.

The methods and systems discussed herein enable a consumer to make a cardless withdrawal at an ATM 104 even when they do not have a traditional transaction account, as long as an issuing institution 108 has sufficient currency to support the withdrawal and approves the consumer, even if the issuing institution 108 is not a traditional financial institution. The processing server 102 enables the cardless withdrawal through performing on-behalf tokenization, where a payment token is generated and utilized on behalf of the issuing institution 108, enabling any type of entity to serve as the issuing institution 108 and not have to make any adjustments to their existing systems to accommodate the process discussed herein. The processing server 102, cardless engine 112, and token processor 114 perform the tokenization and requisite payment network processing functions to enable any issuing institution 108 to allow its customers to conduct withdrawals at ATMs 104 and without the need for payment cards, using the customer's mobile device 106.

Processing Server

Figure 2:
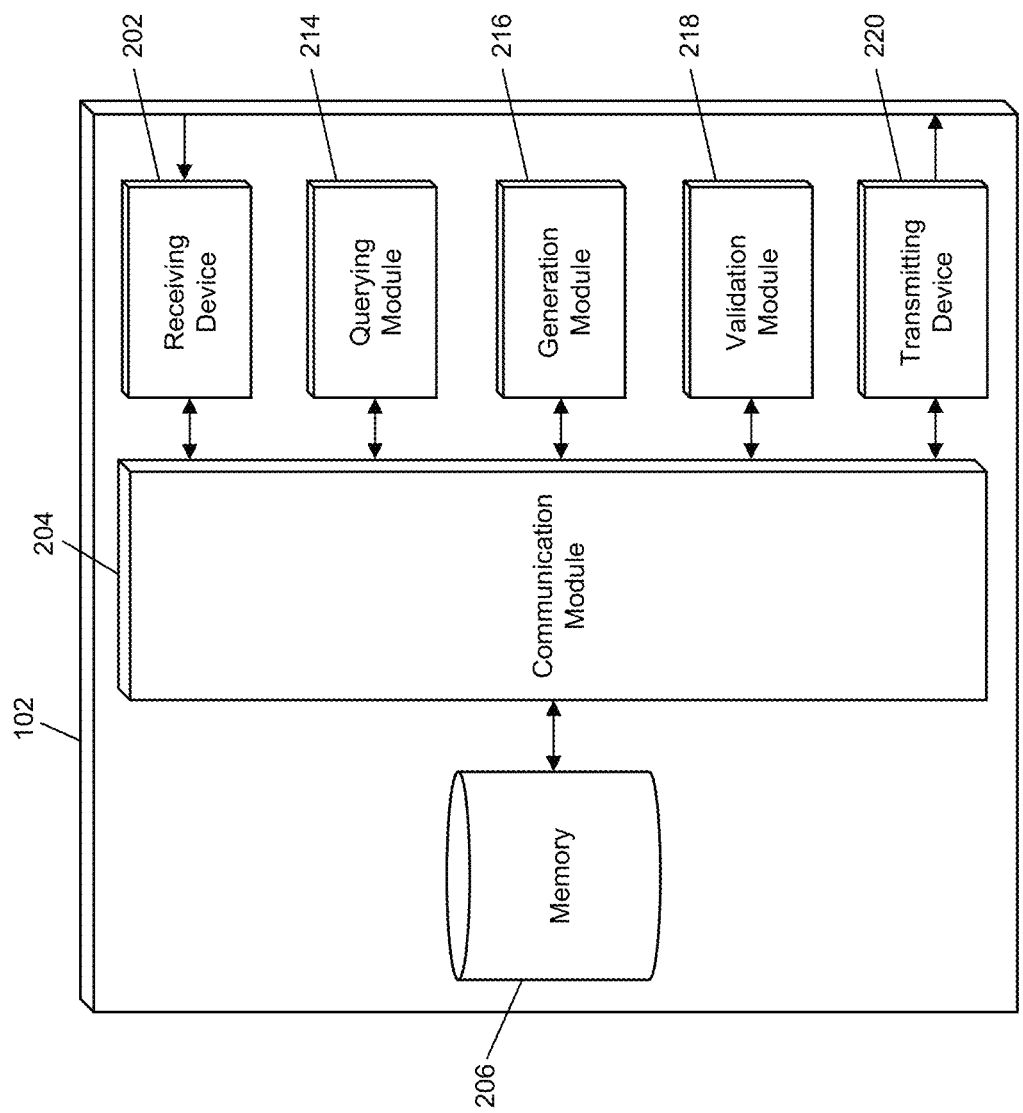
FIG. 2 is a block diagram illustrating the processing server of the system of FIG. 1 for performing on-behalf tokenization for cardless ATM transactions in accordance with exemplary embodiments.

FIG. 2 illustrates an embodiment of the processing server 102. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. In some cases, the processing server 102 as illustrated in FIG. 2 and discussed below may be configured to perform the functions of the cardless engine 112 and/or token processor 114. In some instances, the cardless engine 112 and/or token processor 114 may be implemented using the architecture of the processing server 102 illustrated in FIG. 2 and discussed below.

The processing server 102 may include a receiving device 202. The receiving device 202 may be configured to receive data over one or more networks via one or more network protocols. In some instances, the receiving device 202 may be configured to receive data from issuing institutions 108, ATM operators 110, cardless engines 112, token processors 114, payment networks 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 108 that are superimposed or otherwise encoded with payment token requests (e.g., including account identifiers, validation codes, withdrawal amounts), cardless transaction requests, response messages, etc. The receiving device 202 may be configured to receive data signals electronically transmitted by ATM operators 110 and/or cardless engines 112 that are superimposed or otherwise encoded with authorization requests, validation code requests, etc. The receiving device 202 may also be configured to receive data signals electronically transmitted by token processors 114, which may be superimposed or otherwise encoded with payment tokens, crypto data, detokenized or re-tokenized transaction messages, etc. The receiving device 202 may also be configured to receive data signals electronically transmitted by payment networks 116 that may be superimposed or otherwise encoded with transaction messages, re-tokenization requests, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, validation code generation rules, payment token generation rules, routing information for issuing institutions 108 and ATM operators 110, bank identification range information, crypto data generation and validation rules, payment token and account identifier pairings, etc.

The processing server 102 may include a querying module 218. The querying module 218 may be configured to execute queries on databases to identify information. The querying module 218 may receive one or more data values or query strings, and may execute a query string based thereon on an indicated database, such as the memory 206 of the processing server 102 to identify information stored therein. The querying module 218 may then output the identified information to an appropriate engine or module of the processing server 102 as necessary. The querying module 218 may, for example, execute a query on the memory 206 of the processing server 102 to identify an account identifier corresponding to a payment token included in transaction message for replacement to the account identifier for use in processing of the transaction message.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate payment tokens, crypto data, validation codes, etc.

The processing server 102 may also include a validation module 222. The validation module 222 may be configured to perform validations and verifications for the processing server 102 as part of the functions discussed herein. The validation module 222 may receive instructions as input, which may include data to be validated and/or data to be used in the validation. The validation module 222 may perform a validation or verification as requested, and may output a result of the validation to another module or engine of the processing server 102. The validation module 222 may, for example, be configured to validate payment token requests, cardless withdrawal requests, validation codes, crypto data included in a transaction message, etc.

The processing server 102 may also include a transmitting device 224. The transmitting device 224 may be configured to transmit data over one or more networks via one or more network protocols. In some instances, the transmitting device 224 may be configured to transmit data to issuing institutions 108, ATM operators 110, cardless engines 112, token processors 114, payment networks 116, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 108 that may be superimposed or otherwise encoded with payment tokens, crypto data, tokenized transaction messages, notification data, etc. The transmitting device 224 may also be configured to electronically transmit data signals to ATM operators 110 and/or cardless engines 112, which may be superimposed or otherwise encoded with transaction messages, cardless withdrawal initiation requests, response messages, etc. The transmitting device 224 may be configured to electronically transmit data signals to token processors 114 that are superimposed or otherwise encoded with payment token requests, requests for crypto data, transaction messages, response messages, etc. The transmitting device 224 may also be configured to electronically transmit data signals to payment networks 116, which may be superimposed or otherwise encoded with transaction messages, detokenized transaction messages, re-tokenized response messages, response messages, etc.

Process for Cardless ATM Withdrawal with On-Behalf Tokenization

Figure 3:
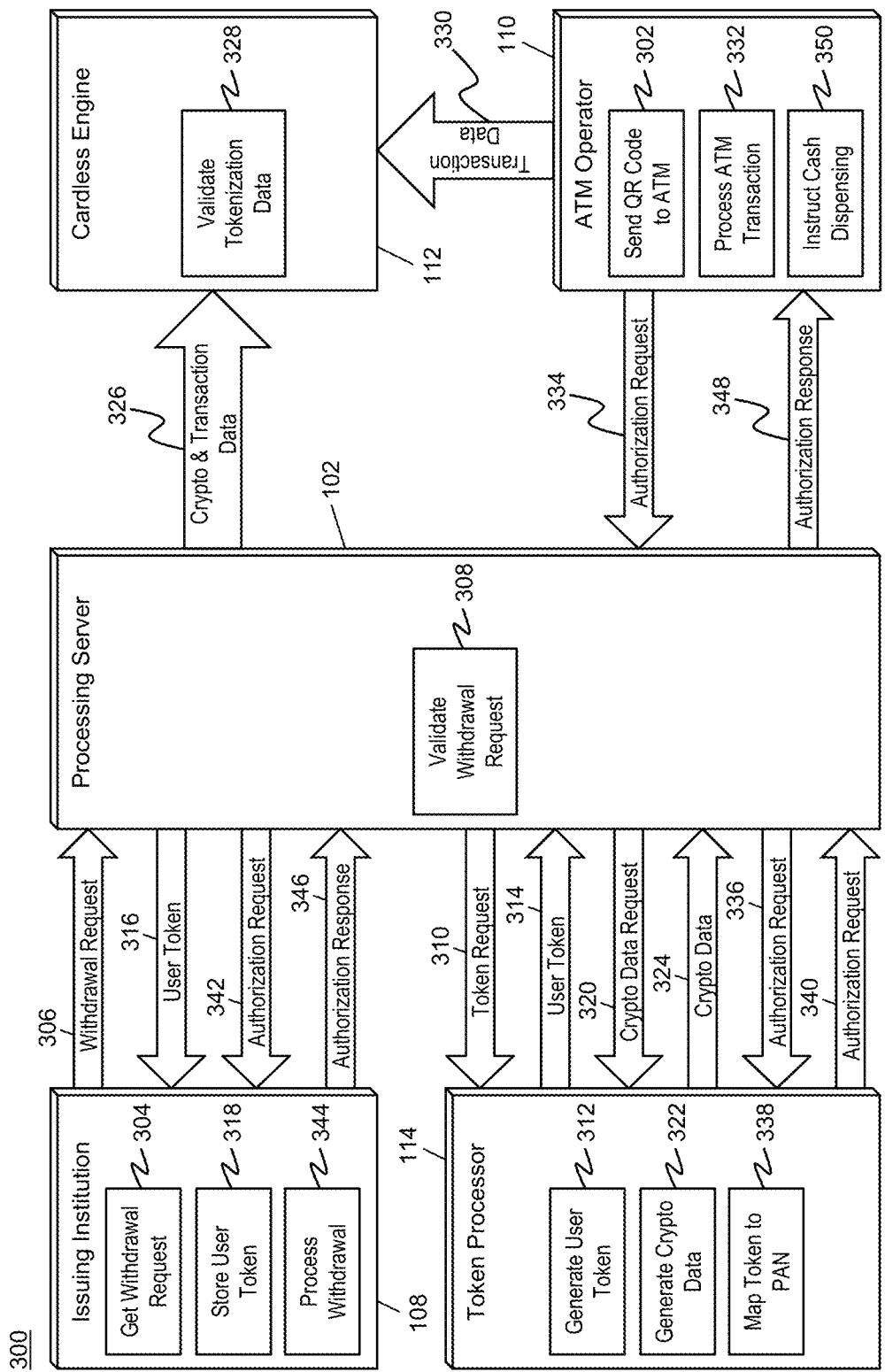
FIG. 3 is a flow diagram illustrating a process for performing a cardless withdrawal at an ATM for an institutional entity using on-behalf tokenization in the system of FIG. 1 using hash chains in accordance with exemplary embodiments.

FIG. 3 illustrates an example process executed in the system 100 of FIG. 1 for a cardless withdrawal at the ATM 104 by a consumer associated with the issuing institution 108 featuring on-behalf tokenization by the token processor 114.

In step 302, the ATM operator 110 may transmit a QR code that is encoded with a validation code to the ATM 104 for display to a user thereof, where the user may read the QR code with their mobile device 106 for submission of the validation code, a selection of their account for withdrawal, and the desired withdrawal amount to their issuing institution 108. The information may be included in a withdrawal request that is submitted to the issuing institution 108 by the mobile device 106 and received by the issuing institution, in step 304. In step 306, the issuing institution 108 may validate the validation code for the consumer and submit its own withdrawal request to the processing server 102, where the withdrawal request may include at least the account identifier and withdrawal amount. In step 308, the processing server 102 may validate the withdrawal request, such as to ensure that the account identifier is proper and to identify if a payment token already exists for the account identifier.

In step 310, the processing server 102 may submit a token request to the token processor 114 if the account identifier is not already associated with a payment token. The token processor 114 may receive the token request and may, in step 312, generate a payment token for the user account. In step 314, the newly generated payment token may be returned to the processing server 112. In step 316, the processing server 102 may transmit the payment token to the issuing institution 108. In step 318, the issuing institution 108 may store the payment token in the user's account profile, such as for use in future withdrawals, where the issuing institution 108 may submit the payment token in a withdrawal request in place of the user's account identifier.

In step 320, the processing server 102 may submit a request for crypto data to the token processor 114 for the payment token, where the request includes at least the payment token. In step 322, the token processor 114 may generate the crypto data, which may include cryptograms, transaction counters, verification codes, and/or any other data that may be necessary for use in processing the withdrawal transaction at the payment network 116 or other entity involved in the transaction. In step 324, the token processor 114 may forward the generated crypto data to the processing server 112. In step 326, the processing server 102 may transmit the crypto data and other transaction data, including the payment token and withdrawal amount, to the cardless engine 112, such as through an API thereof, requesting a cardless ATM withdrawal.

In step 328, the cardless engine 112 may validate the crypto data, and then, in step 330, transmit the crypto data and transaction data to the ATM operator 110. In step 332, the ATM operator 110 may submit an instruction to the ATM 104 to initiate the withdrawal transaction, which may include the ATM 104 collecting authentication information or other additional data from the consumer. The ATM operator 110 may receive such information and any other data from the ATM 104 and may, in step 334, submit an authorization request for the withdrawal to the payment network 116, which may route the authorization request to the processing server 102 as a result of inclusion of the payment token therein. The processing server 102 may receive the authorization request, which may include the payment token, crypto data, withdrawal amount, and any other transaction data.

In step 336, the processing server 102 may forward the authorization request to the token processor 114. In step 338, the token processor 114 may replace the payment token in the authorization request with the account identifier that is mapped thereto. In step 340, the detokenized authorization request may be returned to the processing server 102, which may, in step 342, forward the detokenized authorization request to the issuing institution 108. In step 344, the issuing institution 108 may process the withdrawal, such as by ensuring that the user has sufficient balance in the account associated with the account identifier for the withdrawal and debiting the balance accordingly. In step 346, the issuing institution 108 may return an authorization response to the processing server 102 approving the withdrawal transaction. In step 348, the processing server 102 may forward the authorization response to the ATM operator 110. In some embodiments, the account identifier may be replaced in the authorization response with the payment token prior to forwarding, either by the processing server 102 or the token processor 114. In step 350, the ATM operator 110 may instruct the ATM 104 to dispense the withdrawal amount to the consumer.

Exemplary Method for Performing On-Behalf Tokenization

Figure 4:
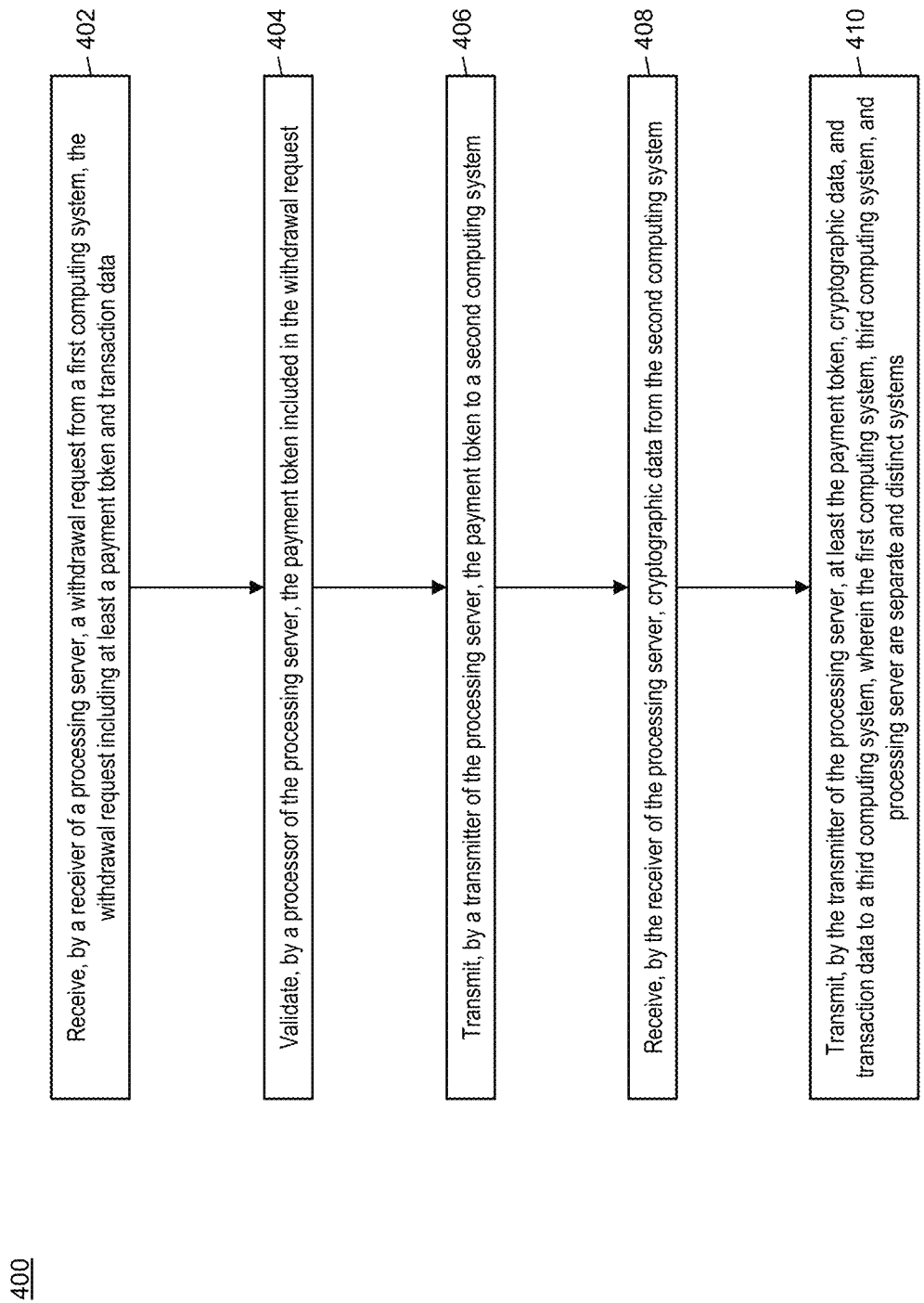
FIG. 4 is a flow chart illustrating an exemplary method for performing on-behalf tokenization for an ATM transaction to enable cardless transactions for any institutional entity in accordance with exemplary embodiments.

FIG. 4 illustrates a method 400 for performing on-behalf tokenization for an automated teller machine (ATM) transaction to enable cardless transactions for any institutional entity.

In step 402, a withdrawal request may be received by a receiver (e.g., the receiving device 202) of a processing server (e.g., the processing server 102) from a first computing system (e.g., the issuing institution 108), where the withdrawal request includes at least a payment token and transaction data. In step 404, the payment token included in the withdrawal request may be validated by a processor (e.g., the validation module 218) of the processing server.

In step 406, the payment token may be transmitted by a transmitter (e.g., the transmitting device 220) of the processing server to a second computing system (e.g., the token processor 114). In step 408, cryptographic data may be received by the receiver of the processing server from the second computing system. In step 410, at least the payment token, cryptographic data, and transaction data may be transmitted to a third computing system (e.g., the cardless engine 112) by the transmitter of the processing server, where the first computing system, third computing system, and processing server are separate and distinct systems.

In one embodiment, the method 400 may further include: receiving, by the receiver of the processing server, a transaction message from a fourth computing system (e.g., the ATM operator 110, payment network 116, etc.), the transaction message including at least the payment token and cryptographic data; and transmitting, by the transmitter of the processing server, a response message to the fourth computing system, the response message including at least the payment token and a response code indicating approval of a transaction. In a further embodiment, the method 400 may also include: transmitting, by the transmitter of the processing server, the transaction message to the second computing system; and receiving, by the receiver of the processing server, the response message from the second computing system.

In another further embodiment, the method 400 may also include: validating, by the processor of the processing server, the cryptographic data included in the transaction message; replacing, by the processor of the processing server, the payment token included in the transaction message with a mapped account number; and transmitting, by the transmitter of the processing server, the transaction message including the mapped account number. In an even further embodiment, the transaction message may be transmitted to the first computing system. In a yet further embodiment, the method 400 may further include: receiving, by the receiver of the processing server, a responding message from the first computing system, the responding message including the response code indicating approval of the transaction and the mapped account number; and replacing, by the processor of the processing server, the mapped account number included in the responding message with the payment token to generate the response message.

In some embodiments, the second computing system may be a secondary processor included in the processing server. In one embodiment, the first computing system may be operator by or on-behalf of a non-financial institution entity.

Computer System Architecture

Figure 5:
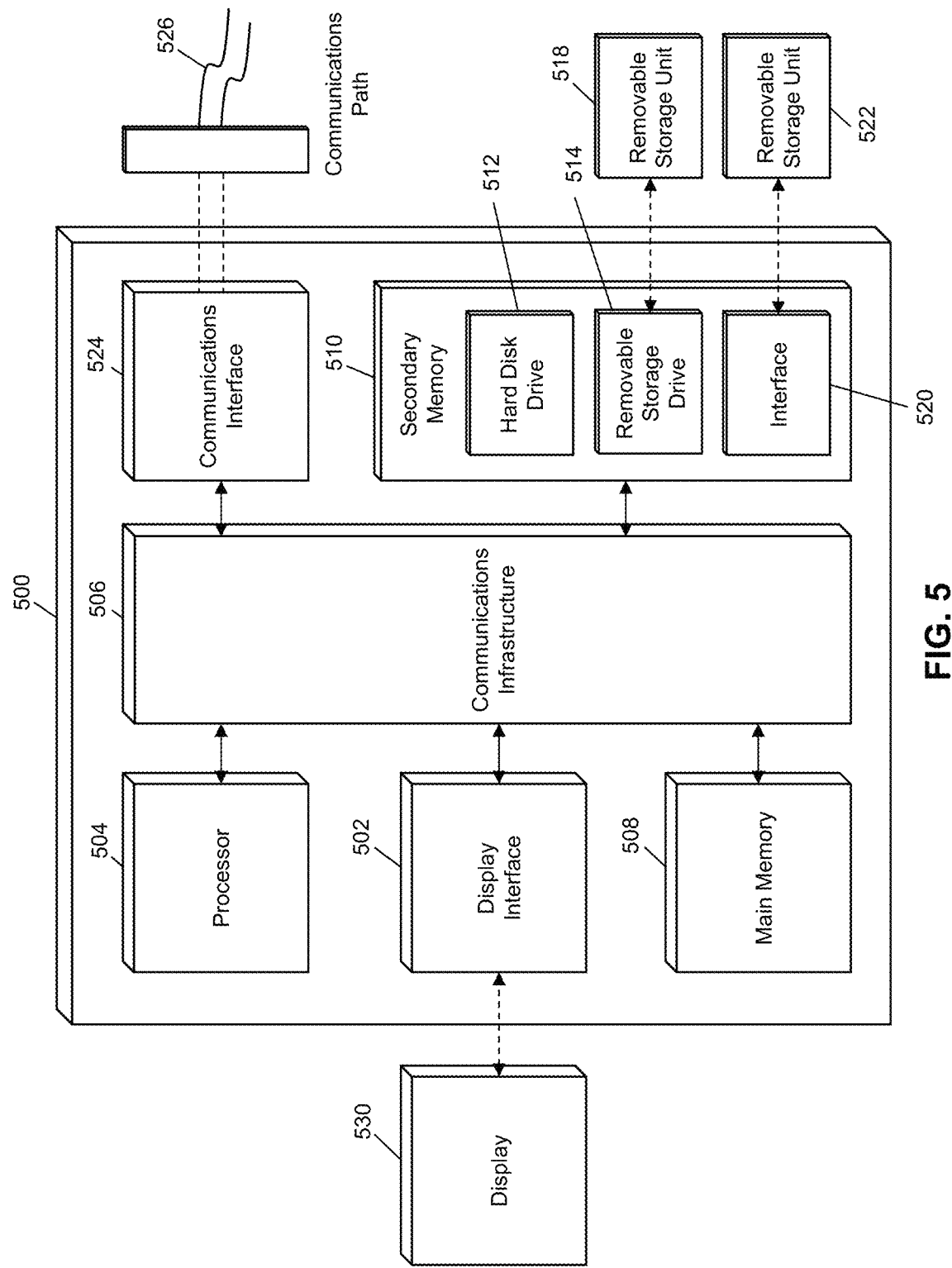
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102, cardless engine 112, and token processor 114 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for performing on-behalf tokenization for an automated teller machine to enable cardless transactions for any institutional entity. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for performing on-behalf tokenization for an automated teller machine (ATM) transaction to enable cardless transactions for any institutional entity, comprising:
    receiving, by a receiver of a processing server, a withdrawal request from a first computing system, the first computing system being a computing system of a non-financial institution, the withdrawal request including at least a payment token and transaction data, the payment token generated by a second computing system that is separate and distinct from the first computing system;
    validating, by a processor of the processing server, the payment token included in the withdrawal request;
    transmitting, by a transmitter of the processing server, the payment token to the second computing system;
    receiving, by the receiver of the processing server, cryptographic data from the second computing system; and
    transmitting, by the transmitter of the processing server, at least the payment token, cryptographic data, and transaction data to a third computing system,
    wherein the first computing system, third computing system, and processing server are separate and distinct systems, and
    wherein the non-financial institution is one of a social network, and a merchant.

2. The method of claim 1, further comprising:
    receiving, by the receiver of the processing server, a transaction message from a fourth computing system, the transaction message including at least the payment token and cryptographic data; and
    transmitting, by the transmitter of the processing server, a response message to the fourth computing system, the response message including at least the payment token and a response code indicating approval of a transaction.

3. The method of claim 2, further comprising:
    transmitting, by the transmitter of the processing server, the transaction message to the second computing system; and
    receiving, by the receiver of the processing server, the response message from the second computing system.

4. The method of claim 2, further comprising:
    validating, by the processor of the processing server, the cryptographic data included in the transaction message;
    replacing, by the processor of the processing server, the payment token included in the transaction message with a mapped account number; and
    transmitting, by the transmitter of the processing server, the transaction message including the mapped account number.

5. The method of claim 4, wherein the transaction message is transmitted to the first computing system.

6. The method of claim 5, further comprising:
    receiving, by the receiver of the processing server, a responding message from the first computing system, the responding message including the response code indicating approval of the transaction and the mapped account number; and
    replacing, by the processor of the processing server, the mapped account number included in the responding message with the payment token to generate the response message.

7. The method of claim 1, wherein the second computing system is a secondary processor included in the processing server.

8. A system for performing on-behalf tokenization for an automated teller machine (ATM) transaction to enable cardless transactions for any institutional entity, comprising:
    a first computing system, the first computing system being a computing system of a non-financial institution;
    a second computing system;
    a third computing system; and
    a processing server, the processing server including
        a receiver receiving a withdrawal request from the first computing system, the withdrawal request including at least a payment token and transaction data, the payment token generated by the second computing system that is separate and distinct from the first computing system,
        a processor validating the payment token included in the withdrawal request, and
        a transmitter transmitting the payment token to the second computing system, wherein
        the receiver of the processing server further receives cryptographic data from the second computing system,
        the transmitter of the processing server further transmits at least the payment token, cryptographic data, and transaction data to the third computing system,
        the first computing system, third computing system, and processing server are separate and distinct systems, and
        the non-financial institution is one of a social network, and a merchant.

9. The system of claim 8, further comprising:

a fourth computing system, wherein the receiver of the processing server further receives a transaction message from the fourth computing system, the transaction message including at least the payment token and cryptographic data, and the transmitter of the processing server further receives a response message to the fourth computing system, the response message including at least the payment token and a response code indicating approval of a transaction.

10. The system of claim 9, wherein the transmitter of the processing server further transmits the transaction message to the second computing system, and the receiver of the processing server further receives the response message from the second computing system.

11. The system of claim 9, wherein the processor of the processing server further validates the cryptographic data included in the transaction message, the processor of the processing server further replaces the payment token included in the transaction message with a mapped account number, and the transmitter of the processing server further transmits the transaction message including the mapped account number.

12. The system of claim 11, wherein the transaction message is transmitted to the first computing system.

13. The system of claim 12, wherein the receiver of the processing server further receives a responding message from the first computing system, the responding message including the response code indicating approval of the transaction and the mapped account number, and the processor of the processing server further replaces the mapped account number included in the responding message with the payment token to generate the response message.

14. The system of claim 8, wherein the second computing system is a secondary processor included in the processing server.

* * * * *